United States Patent [19]

Priegel

[11] 4,122,716
[45] Oct. 31, 1978

[54] AIR FLOW TRANSDUCER

[75] Inventor: Jack C. Priegel, El Paso, Tex.

[73] Assignee: Autotronic Controls Corporation, El Paso, Tex.

[21] Appl. No.: 802,650

[22] Filed: Jun. 2, 1977

Related U.S. Application Data

[60] Division of Ser. No. 724,073, Sep. 17, 1976, which is a continuation of Ser. No. 470,566, May 16, 1974, abandoned, which is a division of Ser. No. 122,933, Mar. 10, 1971, Pat. No. 3,817,225.

[51] Int. Cl.$^2$ ............................................. G01F 1/115
[52] U.S. Cl. ................................................ 73/231 R
[58] Field of Search ................. 73/231 R, 231 M, 229

[56] References Cited

U.S. PATENT DOCUMENTS

| | | | |
|---|---|---|---|
| 2,089,134 | 8/1937 | Petroff | 73/229 |
| 3,948,099 | 4/1976 | Geisow | 73/231 R |

FOREIGN PATENT DOCUMENTS 893,556  4/1962  United Kingdom .................... 73/229

*Primary Examiner*—Charles A. Ruehl
*Attorney, Agent, or Firm*—Marcus L. Bates

[57] ABSTRACT

An electronic fuel injection system for maintaining absolute control over the air to fuel ratio flowing to the combustion chambers of an internal combustion engine. The system includes means for measuring the air flow rate to the engine. The flow rate measurement is converted into a proportional electrical signal which flows to a signal summing unit.

The fuel flow rate from a fuel pump is controlled by a signal received from the signal summing unit, and provides a controlled fuel flow to the engine which is proportional to the air flow. Means associated with the fuel pump measures the exact flow rate therefrom and converts the measurement into another proportional electrical signal which is fed back to the summing unit to thereby form a closed loop circuit. The summing unit compares the first signal with the second signal and changes the fuel flow rate the required amount to maintain the ratio thereof at a predetermined value.

There is optionally included within the system a warm-up enrichment, acceleration enrichment, and temperature and barometric pressure conversion means, all of which are connected back to the summing unit so as to provide extremely close control over all parameters affecting the air to fuel ratio.

5 Claims, 8 Drawing Figures

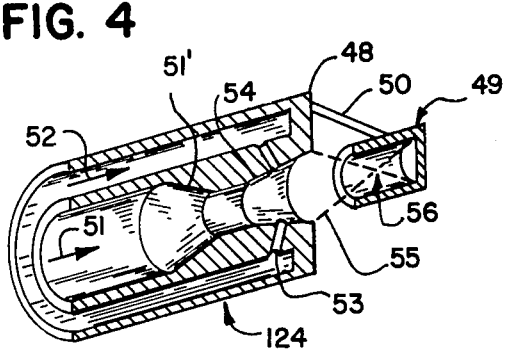
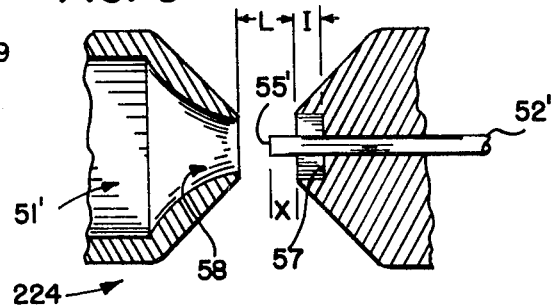
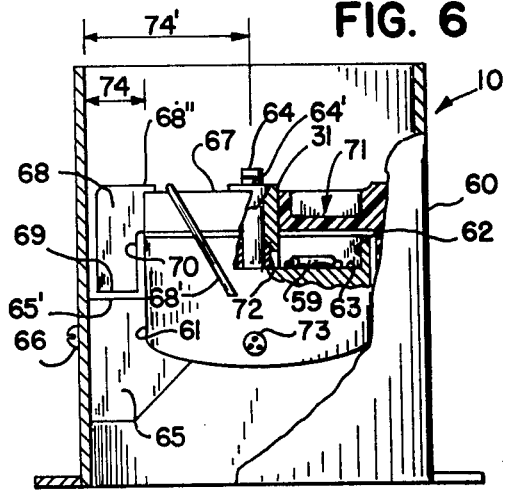
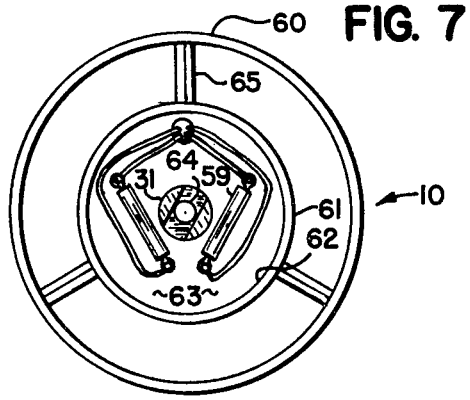
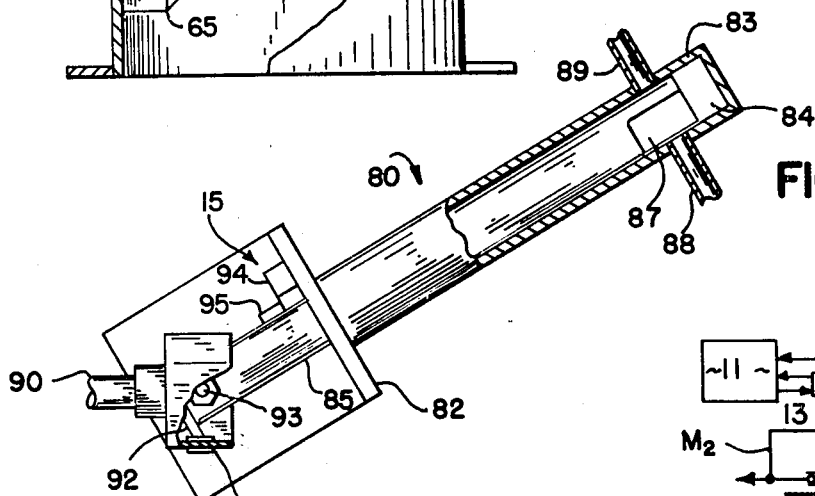
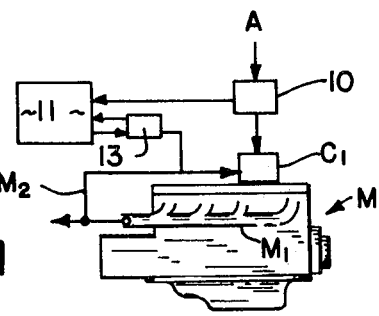

AIR FLOW TRANSDUCER

This application is a division of application Ser. No. 724,073, filed Sept. 17, 1976, copending herewith, which in turn was a continuation of application Ser. No. 470,566, filed May 16, 1974, copending therewith and now abandoned, which in turn was a division of application Ser. No. 122,933, filed Mar. 10, 1971, copending therewith and now U.S. Pat. No. 3,817,225, issued June 18, 1974.

BACKGROUND OF THE INVENTION

Throughout the specification and claims, the term "I.C." is to be understood to relate to an "internal combustion engine", while "A/F" is to be understood to means "air to fuel ratio". The term "signal" relates to a current or voltage pulse of any suitable value and wave form which is compatible with the teachings of this invention.

Pollution of our environment with exhaust emissions from internal combustion engines is considered to be a primary health hazard, and for this reason great emphasis is presently being placed upon the provision of means approaching complete combustion of hydrocarbon fuels to thereby lower undesirable or hazardous exhaust emissions to a minimum. Modern electronic technology provides vastly improved means by which the A/F ratio of the gaseous mixture contained within combustion chambers can be maintained at a predetermined value in a manner which is far superior to mechanical carburetors of the prior art. For example, Mycroft, U.S. Pat. Nos. 3,470,858; Westbrook et al, 3,272,187; and Wallis, 3,240,191 propose various systems for more closely controlling the A/F ratio in internal combustion engines, and to which reference is made for further background of this invention.

In these and other prior art systems for controlling A/F ratio, the air flow rate generally has been utilized to influence the fuel flow rate, with mechanical provision be made for warm-up enrichment, acceleration enrichment, as well as for temperature and barometric changes. However, once the fuel flow rate demanded by a particular instantaneous mass air flow rate has been determined by the prior art electronic circuitry, control over the system is generally left to chance, and as may be expected, variations in the system downstream of the controlling sensor means inherently changes a sufficient amount to render all of the previous control work inefficient.

Therefore, it is desirable to provide an improved electronic carburetion system for controlling the A/F to an I.C. engine, and to positively measure the fuel flow rate from the fuel pump so as to enable comparison of the actual fuel flow rate to be made with the measured mass air flow rate, thereby enabling further correction means to be employed as the ratio therebetween changes from a predetermined ideal value.

SUMMARY OF THE INVENTION

This invention comprehends an electronic carburetion system for controlling the A/F in the combustion chambers of an I.C., comprising: transducer means for measuring the air flow rate to the intake system of the I.C. and for producing an electrical signal proportional thereto. A fuel pump is controllably driven at a rate which is proportional to the air flow rate signal. The fuel flow rate to the I.C. is then measured and converted into an electrical signal which is proportional to the fuel flow rate, and this resulting signal is electronically compared to the corrected air flow signal, to thereby determine that a combustible mixture having the proper A/F is being ingested by the I.C. Should this actual A/F value differ from the predetermined desired value, correction is immediately made by the circuitry so as to increase or decrease the fuel flow rate to the optimum predetermined desired set value.

Included with the before recited method, there is further provided apparatus for carrying out the invention which includes a transducer for converting the volumetric air flow rate into a frequency. The frequency is converted into the before mentioned signal which is in turn connected to a signal summing unit. The signal summing unit receives a signal from each of the desired parameters which must, of course, include a signal from the mass air flow rate sensor and the fuel flow rate sensor so as to enable attaining the foregoing described control.

The fuel pump is driven by a motor, with the motor being connected to a positive displacement metering pump which has associated therewith a transducer means for converting absolute fuel flow rate to a frequency. The frequency is converted into a suitable signal which can be connected to the before mentioned signal summing unit so as to attain the aforesaid results.

A particular atomizer is connected to the metering pump so as to attain efficient atomization of the liquid fuel. The atomizer and the fuel pump can take on several different forms.

BRIEF DESCRIPTION OF THE DRAWINGS

FIG. 1 is a schematical representation which includes any internal combustion engine, with the instant invention being diagrammatically illustrated in association therewith;

FIG. 4 sets forth a perspective, longitudinal, part cross-sectional representation of a sub-combination of the invention;

FIG. 5 is a fragmentary, cross-sectional view of a second embodiment of the apparatus previously disclosed in FIG. 4;

FIG. 6 is a part cross-sectional, part elevational view of another sub-combination of this invention;

FIG. 7 is a top plan view of FIG. 6, with some parts thereof being removed and other parts thereof being shown in cross-section; and FIG. 8 is a fragmentary, part cross-sectional view of a pump which can be used in conjunction with the present invention.

DESCRIPTION OF THE PREFERRED EMBODIMENTS

Figure 2:
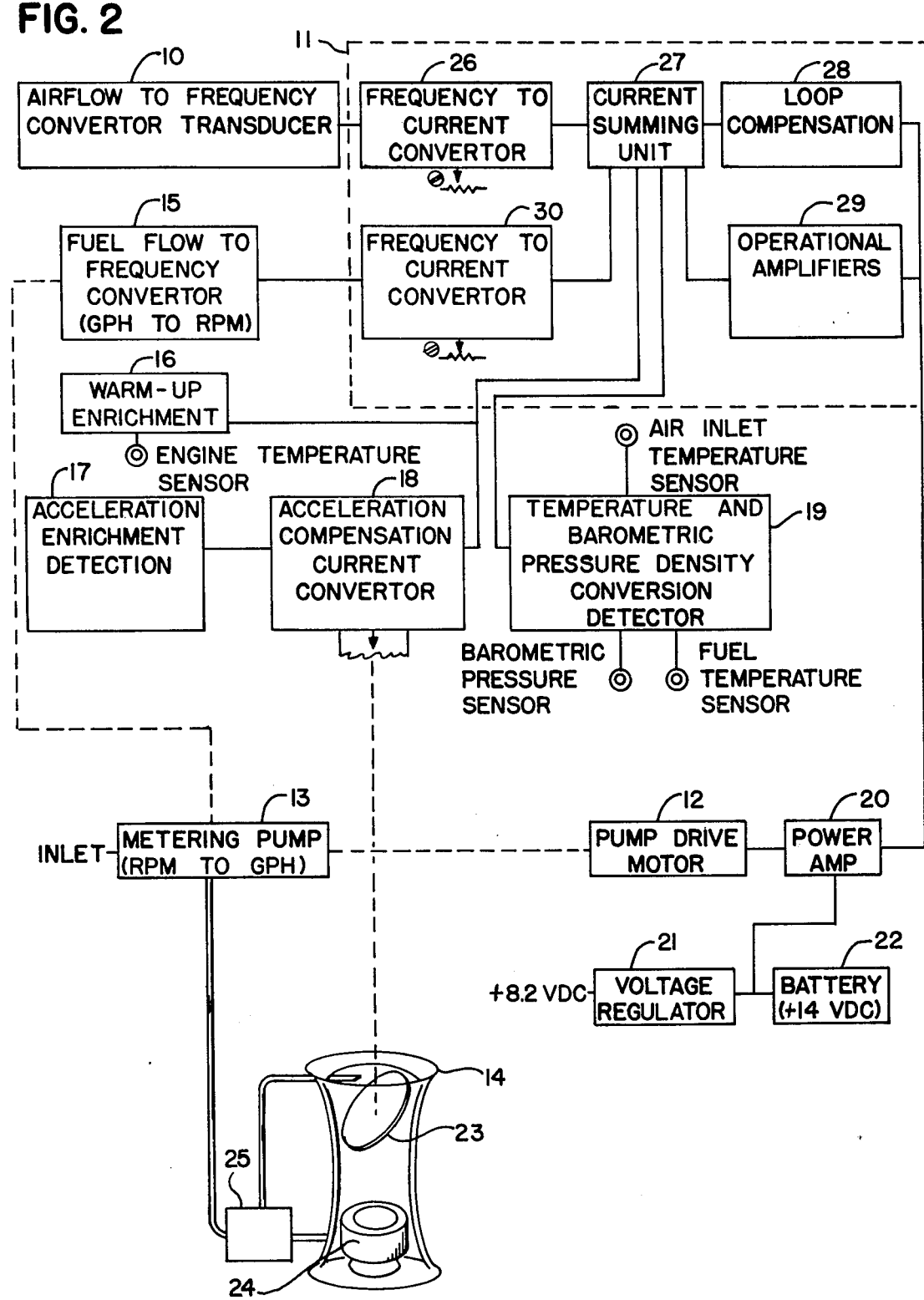
FIG. 2 is a flow sheet which diagrammatically sets forth the essence of one form of the present invention.

Throughout this specification, wherever possible, like or similar numerals will be applied to denote like or similar elements of construction.

FIG. 1 diagrammatically discloses a motor generally indicated at the arrow M. An exhaust manifold M1 is connected thereto in the usual manner, with part of the exhaust gases optionally flowing at M2 into carburetion system C1. Transducer means for measuring the air flow rate to the engine is diagrammatically seen illustrated at 10, with air flowing at A through the metering means. Controller 11 receives a signal from 10 and controls the rate of fuel flow into the internal combustion engine at 13. Feedback from 13 to the controller is seen diagrammatically illustrated by the arrows in the drawing.

The flow sheet set forth in FIG. 2 broadly discloses the present invention, wherein the illustrated transducer 10 converts air flow rate therethrough into a proportional electrical frequency. The signal from the transducer is in the form of a frequency which is proportional to the volumetric air flow therethrough, and which must be changed to a signal which is suitable for being processed by the electronic controller 11. The controller accordingly is provided with a frequency to current converter 26 which provides the current summing unit 27 with an electric signal which is proportional to the volumetric air flow at 10.

The loop compensation 28 can take on several different forms so long as it properly stablizes the feedback. Since this portion of the circuitry is a common technique known in the art, it will not be discussed in further detail, other than to make reference to one form of the circuitry as disclosed in FIG. 3.

Operational amplifier 29 increases the strength of the signal received from the current summing unit to thereby provide a suitable input signal for the power amplifier 20. The power amplifier controls the level of power input to the pump drive motor.

The pump drive motor drives a metering pump, which preferably is a positive displacement pump as disclosed in FIG. 8, but which may take on several different forms so long as it is a positive displacement type metering apparatus, or the equivalent thereof.

Each cycle of the positive displacement metering pump provides a proportional frequency at 15 which is converted into a current at 30 to thereby provide a signal which is suitable for being processed by the current summing unit. Circuitry 30 is similar to the before discussed circuitry 26.

The intake manifold 14 can take on several different known forms, and is illustrated as being in the form of a housing having a butterfly valve 23 disposed therein for controlling the air flow rate to the engine. Atomizer nozzle 24 receives fuel by means of the air bleed crossover valve assembly 25. The illustrated crossover valve and nozzle combination is considered to be but one of several different possible arrangements for atomization of fuel downstream of the fuel pump.

Figure 3:
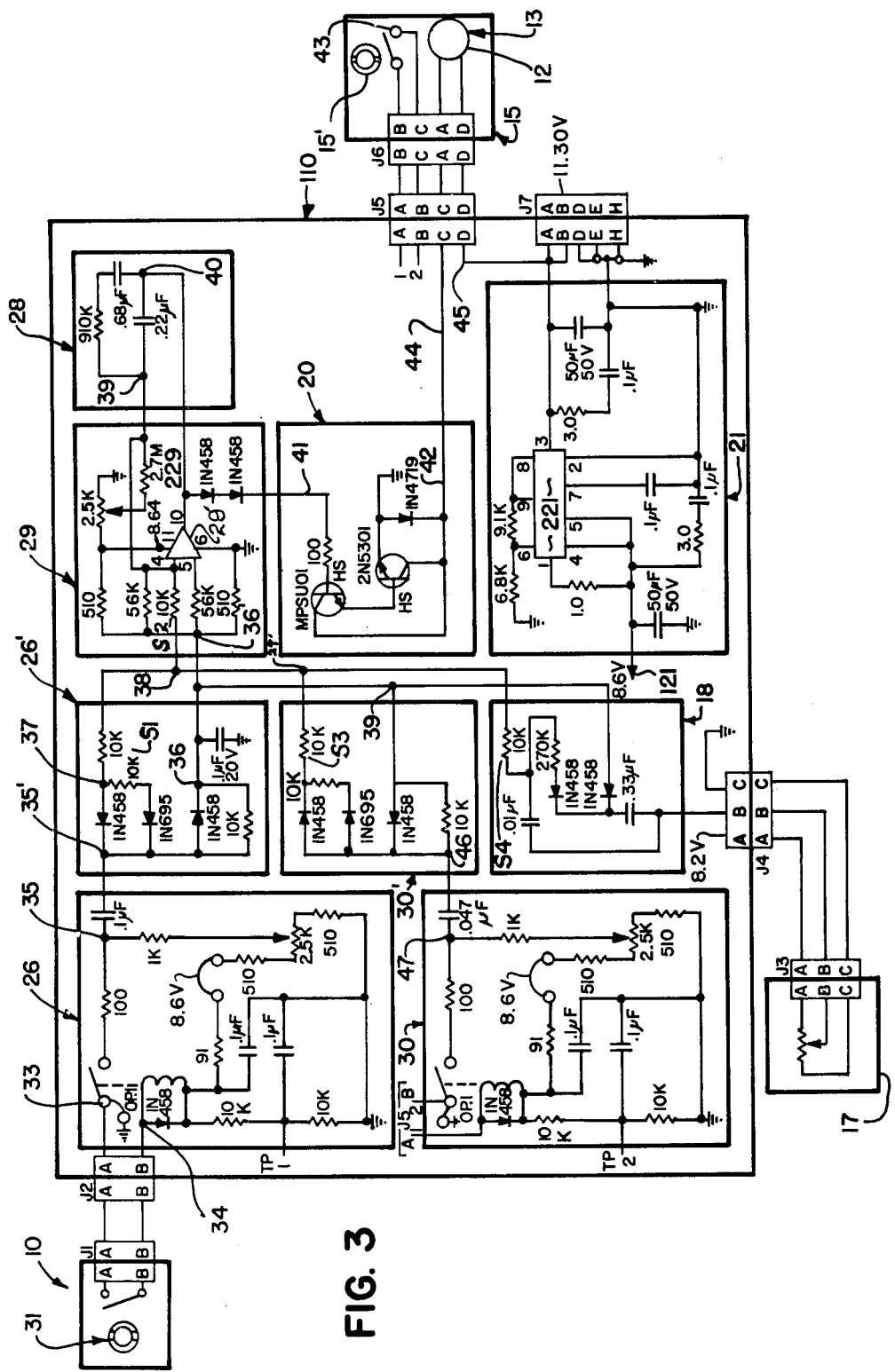
FIG. 3 sets forth a specific embodiment of the invention, wherein there is disclosed a schematical representation of circuitry for carrying out the invention disclosed in FIG. 2.

FIG. 3 discloses one specific example of circuitry for attaining the method generally set forth by the apparatus illustrated in FIGS. 1 and 2. The air flow to frequency converter is seen to include a rotating permanent magnet 31 which actuates the illustrated magnetically actuated switch. The switch is of conventional design. Accordingly, the switch makes and breaks at a rate which is proportional to the volumetric air flow. The transducer is connected by J1 to the controller by means of J2.

The metering pump 13 (the details of which will be more fully discussed later on) is driven by pump motor 12, with a rotatable permanent magnet 15' being connected to rotate with the pump shaft in a manner to actuate the magnetic switch 43 in direct proportion to the speed of the pump or the motor. The fuel flow transducer formed by the switch is connected to J6, which in turn is connected to J5 with the terminals 1 and 2 of J5 being connected to the frequency to current converter 30.

It will be noted that the circuitry 26 is identical to the circuitry 30, with the exception of the coupling capacitors leading from the converter into the summing unit.

Similarly, circuitry 26' is identical to circuitry 30', except that the current direction is opposite. The purpose of each of these individual networks is to receive a pulsating current or frequency, and convert it into a D.C. current which can be added or subtracted one from the other.

The circuitry at 18 differs slightly from the circuitry seen at 26' and 30' for the reason that the signal received from the acceleration enrichment detection apparatus 17 is already a D.C. current and accordingly does not need to be rectified.

Broadly, the circuitry at 26 comprises a means by which a particular wave form may be generated as a result of terminals 33, 34 being cyclically bridged by the transducer 10, with this action supplying an alternating current at 35, with the alternating current being rectified by the circuitry at 26', and the resultant D.C. current being received across the 10K resistor S1 disposed between terminals 37 and 38. The 10K resistor is one of four summing resistors, and has one terminal thereof connected to the common junction at 38, hereinafter called "the summing point".

The current flow from summing point to the 10K resistor S2 of the operational amplifier must therefore have a signal strength of a magnitude which exactly but indirectly controls the power amplifier output to thereby provide the pump drive motor with sufficient current to operate the metering pump at a speed required to deliver a finite flow of fuel for a finite mass air flow rate.

Looking at the details of the frequency to current converter 26 and 26', those skilled in the art will realize that the circuitry 26 is arranged whereby it can be in the form of printed circuitry disposed on a card, or alternatively, can be an integrated circuit in the form of a "chip".

The transducer 10 effectively shorts or bridges terminal 33 to terminal 34 each revolution of the magnet 31 to thereby provide a signal at 35 which consists of a square wave pulse of a controlled amplitude, because of the following current flow path:

The action of transducer 10 energizes the solenoid actuated switch at 33, with the latter making and breaking in response to the former. This expedient avoids criticality beyond the circuit proper 26 which may otherwise be brought about as a result of lead loss, inductance, and the like. Hence, the employment of dual switches provides a means by which the incoming signal from the transducer may be absolutely cleaned up.

The signal at 35 consists of a square wave pulse, the amplitude of which is controlled by the illustrated 2.5K potentiometer, to provide for adjustment of ratio control. This signal at 35 is coupled to the rectifier bridge of 26' by the 0.1 MF capacitor.

In the rectifier bridge, a positive and negative transmission is received at 35', which can appropriately be characterized as a differential wave form, with the negative transition going through the parallel arranged diodes between 35', 37 and the positive transition going to ground through the 0.1 MF capacitor near junction 36. The two diodes are placed in parallel at 35', 37; with one of the diodes being placed in series with the illustrated 10K resistor in order to achieve internal temperature compensation, or to stabilize the circuitry for temperature.

The signal imposed upon summing resistor S1 is considered to be a current which is proportional to frequency, and which goes to the operational amplifier at the summing point.

Those skilled in the art will now recognize that the operation of the circuitry at 30, 30' is essentially identical to the operation of the circuitry at 26, 26', except that the diodes are reversed with the positive transition of circuitry 30' being connected to S3 and the negative transition being connected to ground through the before mentioned 0.1 MF capacitor near junction 36.

Hence, there is received at the summing point a positive transition from transducer 10, a negative transition from transducer 13, and a positive transition from the circuitry 18. When the sum of the signals are equal and opposite, the null point of operation has been reached, and the system has attained its frequency of operation for a particular flow rate.

Circuitry 18 is similar to 30' and provides a positive transition at summing resistor S4, in response to throttle advancement. Increase in current magnitude is brought about by acceleration demand so as to enrich the A/F. This signal rapidly decays as an exponential function so as to provide an I.C. with an instantaneously richer combustion mixture, which rapidly returns to the new null point, or set point, commensurate with the increased flow rates.

The operational amplifier 29' is comprised of complex circuitry which is familiar to those skilled in the art. The amplifier receives a predetermined magnitude of current at 38 which is proportional to the air flow rate through the transducer 10. This signal is imposed upon the 10K resistor S2 which is connected between junction 38 and terminal 4 of the operational amplifier. Accordingly, as the current between junction 38 and 36' varies, this signal will be amplified so that the resultant current at 41 is of the exact magnitude required to either speed up or retard the fuel pump an amount necessary to maintain a predetermined air fuel ratio.

The power amplifier 20 as well as the voltage regulator 21 are conventional in design and merely represent one of several circuits which could be used for this function, and accordingly, will not be discussed in greater detail since the circuitry thereof is amply disclosed in FIG. 3.

The atomizing nozzle 124 of FIG. 4 is a converging, diverging, super-sonic nozzle, hereinafter called an "atomizer". The main body 48 of the atomizer is preferably housed within a conduit which forms part of the intake manifold assembly of the engine. The housing includes a cup-like cavity 29 disposed downstream thereof with the outwardly opening cavity being axially aligned with the central longitudinal axis of the housing. Support member 50 rigidly maintains the cup centrally disposed with respect to the housing.

A small portion of the exhaust gases from the exhaust manifold are diverted to flow at 51 into the converging section 51'. Fuel flows through annulus 52 and through the radially spaced apart passageways 53 into the diverging portion 54 of the throat. Atomized fuel follows the dash-dot line seen at 55 and impinges upon the vibrating cup in a manner seen indicated at 56.

In the embodiment of FIG. 5, exhaust gases flow at 51' while fuel enters hollow tube 52' and exits at 55', where the exhaust gases carry the atomized fuel into the cup 57. Converging section 58 directs the flow of exhaust gases into the cup. The depth "I" of the cup, the length "X" of the rod, and the distance "L" between the faces determine the frequency of vibration of the nozzle.

Looking now to the details of the transducer 10 as particularly shown in FIGS. 6 and 7, there is illustrated a cylindrical housing 60 forming a substantially straight air passageway of substantially circular cross section. The housing 60 has an outwardly disposed flange about one peripheral edge portion thereof to facilitate attachment of the transducer to the manifold at a location upstream of the control valve 23. Axially aligned within the housing is a stator formed of a main stator body 61 having an upstanding skirt 62 which forms a cavity 63 for housing at least one magnetically actuated switch 59. The switches are anchored to the floor of the cavity by any suitable attachment means, with electrical conductors leading therefrom in the illustrated manner of FIG. 7. A stationary shaft 64 has a keeper 64' removably affixed to a marginal free end portion thereof, with the fixed end of the shaft being rigidly secured within structure of the body. Radially spaced apart streamlined vanes 65 supportingly attach the stator body to the sidewall of the housing by means of a removable fastener 66. The vanes present a small frontal area and provide means for straightening air flow through the annular air passageway 74 between the housing 60 and the stator body 61. A rotor having a main body portion 67 is rotatably mounted on the shaft 64 and held thereon by the keeper 64'. Integrally formed with the main body portion 67 and extending outwardly therefrom are a plurality of spaced apart blades 68 equally spaced around the periphery of the main body portion 67 with the blades being disposed with respect to the axial air flow to provide an angle at 68' of 43° therebetween to intercept air flowing through the passageway and be moved thereby. The lower extremity 69 of each rotor blade is slightly spaced apart from the upper extremity 65' of a stator support vane. The blade is provided with an inside edge portion 70 which clears the exterior wall of the stator body 61 in close tolerance relationship therewith. The blades 68 and the main body portion 67 are integrally formed from foamed polyurethane plastic.

The rotor has a circumferentially extending lightening depression 71 outwardly disposed of a central built-up interior portion thereof so as to form the illustrated axial passageway within which there is received the permanent magnet 31.

The upstanding stationary shaft 64 has a low friction non-magnetic bushing 72 which slidably receives the drilled passageway of the magnet in low friction engagement therein in the usual manner of a tubular bearing surface.

Electrical connection 73 is equivalent to J1 of FIG. 3.

For purpose of illustration only, FIG. 8 discloses a positive displacement piston pump assembly 80 having a bell shaped rotatable housing 81. Affixed to base 82 is a cylinder 83, the interior of which provides a pumping chamber at 84. Piston 85 reciprocates within the cylinder while duct 87 cooperates with outlet 88 and inlet 89 in a manner which serves the purpose of a valve. Shaft 90 imparts both reciprocatory as well as rotational motion into the piston. Arm 92 engages the housing so as to stroke the piston each revolution of the shaft. The angle formed between the shaft and the piston determines the length of the stroke of the piston, and accordingly, the volume of fluid delivered by the pump. For further details of the operation of the pump per se, reference is made to U.S. Pat. No. 3,168,872.

The pump housing has a magnetically actuated switch 94 attached thereto and in close proximity to a magnet 95 which is attached to and rotates with piston 85. The relative position of the magnet and switch must be located respective to one another whereby the magnetic flux of the rotating magnet will actuate the switch each revolution of the shaft, for all longitudinal positions of the piston relative to the cylinder. Where deemed desirable, the magnet can be affixed to the shaft and the switch disposed adjacent thereto.

OPERATION

When it is desired to commence operation of the motor, in some instances it may be necessary to "charge" the intake manifold with a rich mixture of hydrocarbons, and thereafter maintain a diminishing rich mixture within the combustion chamber until the engine reaches a suitable operating temperature. This can be accomplished by momentarily connecting the fuel pump motor to the battery. This action energizes the pump drive motor a sufficient number of cycles to charge the intake manifold with a rich mixture of hydrocarbons. After the engine has started, the warm-up enrichment apparatus maintains a predetermined rich combustion mixture during the warm-up period of the engine.

Assuming the engine to have reached equilibrium and to be operating at a constant power output, should the throttle setting be changed, this will immediately change the flow rate through the air flow transducer. The transducer preferably is of the disclosed design which is instantaneously responsive to air flow, so as to immediately effect a corresponding change in the signal at junction 38, so that the power effected at conductor 45 immediately changes the fuel flow rate of the fuel pump. The change in rotational speed of magnet 15' is electrically fed back through the closed loop of the frequency to current converter 30, where the signal across the 10K summing resistor connected to junction 27' adds to or subtracts from the other voltages effected at junction 38. This feedback signal provides the before mentioned closed loop circuitry which assures that the A/F remains at the optimum or desired ratio.

When the manifold pressure is suddenly increased, the vaporized fuel in the manifold condenses into larger droplets or particle size to thereby effectively reduce the apparent A/F, or the combustion efficiency, in a resulting manner which is similar to leaning the mixture. Accordingly, the acceleration enrichment apparatus offsets this apparent change in A/F. The enrichment apparatus provides the current summing unit with a signal which has an exponential decay so as to provide an initial large flow of fuel which decays back to a suitable set point, exactly like the action of an accelerator pump on a conventional carburetor.

The air flow transducer used herein is preferably fabricated in accordance with the disclosure as set forth in conjunction with FIGS. 6 and 7 because the vane type transducer has an almost weightless rotor thereon which is instantaneously responsive to changes in the volumetric air flow rate to the engine. The rotor is made of foamed polyurethane and is of one piece construction. The magnet 31 is cemented within the formed central passageway of the rotor, and each of the vanes are disposed at an angle of 43°. The blade angle and size is selected to give the maximum torque for the mass of the blade, as well as the optimum resultant mechanical advantage due to the angle of aerodynamic reaction on the flat portion of the blade.

The trailing edge portion of each vane is set at a large radius and encloses a marginal portion of the housing so as to present a maximum surface area to the air flowing through the annulus 74, thereby gaining the maximum mechanical leverage. The width of the vanes of the rotor are maintained at the optimum ratio with respect to radius 74'. Otherwise, the innermost portion of the rotor will offer excess drag at high air flow velocities. The rotor blade is built up at 68' so as to transfer loads from the trailing edge portion back up into the main portion 67 of the rotor. The use of foamed plastic provides an extremely lightweight rotor of more than adequate strength, and brings about an unexpected response rate with respect to the air flowing through the transducer.

It is essential that the rotor be supported by a low friction journal means in order that the starting torque resulting from air movement thereacross be of a large value as compared to the resisting frictional torque.

At any specific air flow rate through the housing, there is a variation in velocity from point to point across a section thereof. By ducting the air through the illustrated annulus, a smoother flow across the sensing blades is effected. Disposition of the effective blade area within this annulus discourages any pumping action at extreme velocities.

Straightening vanes may be disposed upstream of the blades so as to minimize any spiral effect which may otherwise be generated because of the inherent flow characteristics of a duct.

The extra magnetically actuated switch is provided to avoid disassembly of the unit in the event the first switch should fail. The rotor, the magnetic switches of the apparatus, the motor, the pump, and the pot are the only moving parts of the system.

It is possible to substitute a small inductance coil for the magnetic switch if deemed desirable; however, since the probability of failure of one of the switches is remote, the advantages of the magnetic switch offsets this alternate feature.

In operation of the nozzle of FIG. 5, a small portion of the exhaust gases are recirculated at 51' so as to provide a fluid drive for the nozzle and at the same time to ingest inert flue gases into the induction system of the vehicle, which further reduces the formation of oxides of nitrogen because of the diluent effect. The exhaust gases converge at 58 and exit from the nozzle as a jet stream which impinges upon cup 57. The cup vibrates at a frequency which is coincident with the rod. In order to achieve this result, the free end portion of the rod must have a planar surface thereon with sharp edges facing the jet stream. Hence, the resonant cavity, together with the resonant rod, accentuate each other to thereby produce greater shearing velocities which literally explode the hydrocarbons impinging on the rod and the cup so that complete vaporization of the fuel is achieved in a manner which has not heretofore been attained.

It is also possible to utilize cylinder head pressures rather than the exhaust manifold pressure as a source of fluid pressure for the sonic atomizer of either FIGS. 4 or 5.

Those skilled in the art of pneumatic circuitry realize that "what one can accomplish electrically, one can also duplicate pneumatically". Accordingly, those skilled in the art will envision the substitution of comparable pneumatic apparatus and flow conduits for the electronic circuitry used herein so as to practice the essence of the present invention. Therefore, such an expedient is contemplated by this invention, and is to be considered to lie within the metes and bounds of the intellectual property claimed herein.

I claim:

1. An air-flow transducer for measuring the rate of air flow into the intake manifold of an internal combustion engine, said transducer comprising:

a housing forming a substantially straight passageway of substantially circular cross section, means for mounting said housing to pass the air flowing to said intake manifold through said passageway, a stator fixedly mounted in respect to said housing;

a rotor mounted within said passageway for rotation relative to said stator about the axis of said passageway, said rotor having a main body portion with a plurality of blades extending outwardly therefrom and equally spaced around the periphery thereof to intercept air flowing through said passageway and be moved by said air, said main body portion and said blades being integrally formed of low density plastic, and signal means for providing an electrical signal systematically related to the rate of rotation of said rotor relative to said stator as produced by the flow of air through said passageway, said signal means including position marking means mounted on said rotor, and sensing means mounted on said stator and responsive to said position marking means.

2. An air-flow transducer according to claim 1 wherein said position marking means comprises a magnet, and said sensing means comprises magnetically actuated switch means disposed in close proximity to said magnet.

3. An air-flow transducer according to claim 1 wherein said plastic is foamed.

4. An air-flow transducer according to claim 3 wherein said foamed plastic is foamed polyurethane.

5. An air-flow transducer according to claim 1 wherein said position marking means comprises a magnet, and said sensing means is responsive to rotational movement of said magnet.

* * * * *